United States Patent
Li et al.

(10) Patent No.: US 7,720,270 B2
(45) Date of Patent: May 18, 2010

(54) METHOD AND APPARATUS FOR IMPROVING INNER AUDITORY CANAL IMAGES

(75) Inventors: Jianying Li, New Berlin, WI (US); Jiang Hsieh, Brookfield, WI (US); Fang Frank Dong, New Berlin, WI (US); Thomas John Myers, Wauwatosa, WI (US); George Edward Seidenschnur, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 918 days.

(21) Appl. No.: 11/302,609

(22) Filed: Dec. 14, 2005

(65) Prior Publication Data

US 2007/0133853 A1    Jun. 14, 2007

(51) Int. Cl.
*G06K 9/00* (2006.01)
(52) U.S. Cl. .................................. 382/131
(58) Field of Classification Search ........... 382/100, 382/128–134; 128/920–930; 250/455–465; 356/39–49; 600/407, 408, 409, 410, 411, 600/412, 413, 414, 424, 425, 426
See application file for complete search history.

(56) References Cited

U.S. PATENT DOCUMENTS

| 5,379,130 A | * | 1/1995 | Wang et al. ............... 358/462 |
| 5,594,767 A | | 1/1997 | Hsieh |
| 5,915,036 A | * | 6/1999 | Grunkin et al. ........... 382/132 |

\* cited by examiner

*Primary Examiner*—Samir A Ahmed
*Assistant Examiner*—Atiba O Fitzpatrick
(74) *Attorney, Agent, or Firm*—Dean Small; Small Patent Law Group

(57) ABSTRACT

Method and apparatus for locally enhancing image data represented as pixels having CT numbers is provided. The image data includes bony structures, and the method comprises segmenting pixels within the image data into areas based on the pixel's CT number. A first area represents a combination of soft tissue and lower density bones and a second area represents higher density bones. A subset of pixels is identified within the first area representative of the lower density bones. An enhancement is applied to the subset of pixels within the first area and to the second area to create an enhanced dataset, and a locally enhanced image is generated based on the image data and the enhanced dataset.

17 Claims, 4 Drawing Sheets

METHOD AND APPARATUS FOR IMPROVING INNER AUDITORY CANAL IMAGES

BACKGROUND OF THE INVENTION

This invention relates generally to computed tomography (CT) image processing, and more particularly, to improving the quality of an image by improving the visualization of both higher and lower density bones.

Efforts have been undertaken to enhance the quality of inner auditory canal (IAC) structure images. Image quality issues with IAC structures include a lack of "sharpness" in the IAC structure and excessive aliasing artifacts that obstruct human anatomy. Undershooting between bones and soft tissues is also a problem related to the deconvolution process.

CT IAC imaging requires good spatial resolution for visualization of both higher density and lower density bones. A higher spatial resolution could be achieved by using higher data sampling for the region and high-pass filtering. Unfortunately, these possible solutions often require additional hardware investment and a higher dose of radiation to the patient in order to maintain the same level of image noise. The extra cost of equipment and increased radiation exposure are both undesirable.

Therefore, a need exists for CT image processing systems and methods which improve the visualization of bone having varying densities within an image without increasing the image noise, and also without requiring purchase of additional equipment or increasing a patient's exposure to radiation. Certain embodiments of the present invention are intended to meet these needs and other objectives that will become apparent from the description and drawings set forth below.

BRIEF DESCRIPTION OF THE INVENTION

In one embodiment, a method for locally enhancing image data represented as pixels having CT numbers, the image data including bony structures, comprises segmenting pixels within the image data into areas based on the pixel's CT number. A first area represents a combination of soft tissue and lower density bones and a second area represents higher density bones. A subset of pixels is identified within the first area representative of the lower density bones. An enhancement is applied to the subset of pixels within the first area and to the second area to create an enhanced dataset. A locally enhanced image is generated based on the image data and the enhanced dataset.

In another embodiment, a system for locally enhancing image data including bony structures, the system comprising a computer for receiving original image data comprising pixels having associated CT numbers. The computer is configured to segment pixels within the image data into areas based on the pixel's CT number. A first area represents a combination of soft tissue and lower density bones, and a second area represents higher density bones. The computer identifies a subset of pixels within the first area representative of the lower density bones, and applies an enhancement to the subset of pixels within the first area and to the second area to create an enhanced dataset. The computer generates a locally enhanced image based on the image data and the enhanced dataset.

In another embodiment, a method for locally enhancing image data including bony structures comprises segmenting pixels within the image data into areas based on the pixel's CT number. A first area represents a combination of soft tissue and lower density bones and a second area represents higher density bones. The first area is segmented based on texture signatures to identify a subset of pixels representative of the lower density bones. The pixels within the second area and the subset of pixels that border the soft tissue are identified as border pixels, and the border pixels are segmented from the second area and the subset of pixels. An enhancement is applied to the subset of pixels and the second area to create an enhanced dataset, and a locally enhanced image is generated based on the image data and the enhanced dataset.

Figure 1:
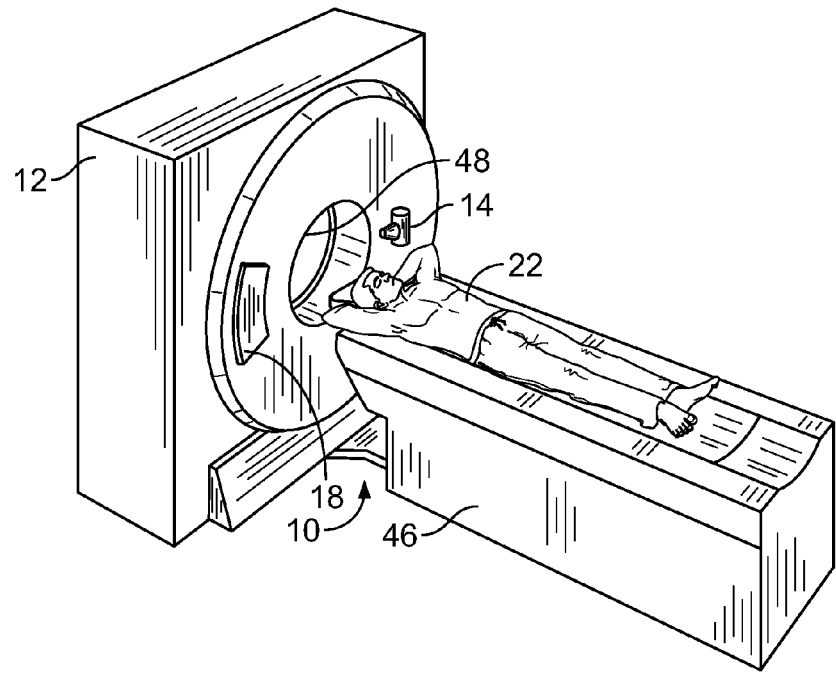
FIG. 1 is a pictorial view of a CT imaging system.

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION OF THE INVENTION

Figure 2:
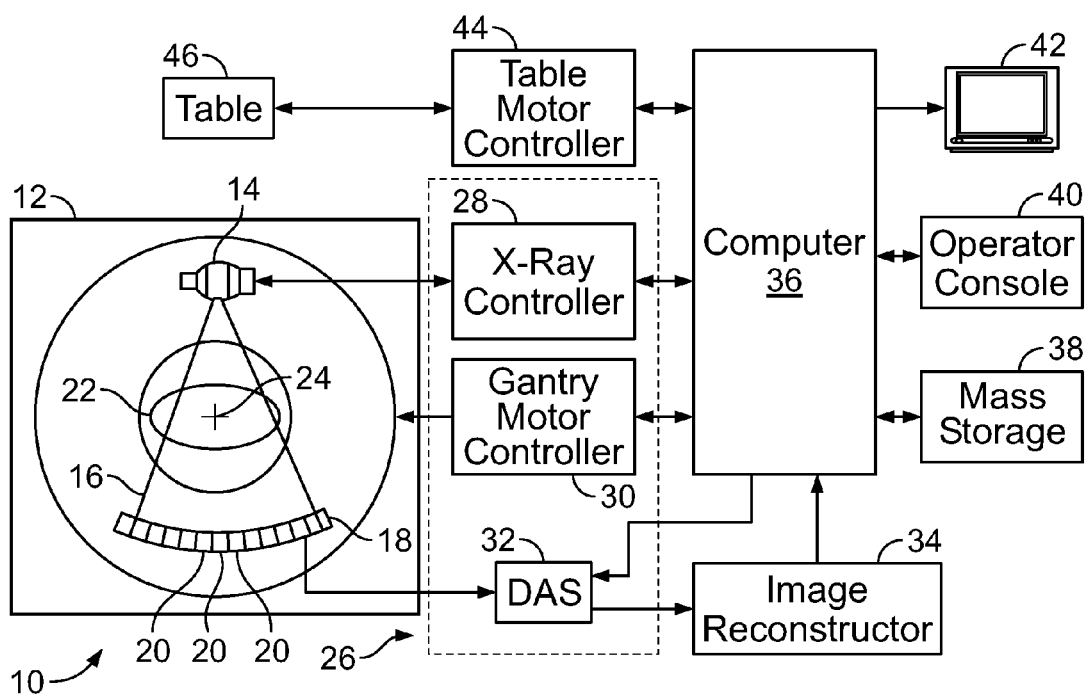
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a patient 22 or object of interest. Each detector element 20 produces an electrical signal that represents the intensity of an impinging x-ray beam and hence the attenuation of the beam as it passes through the patient 22. During a scan to acquire x-ray projection data, gantry 12 and the components mounted thereon rotate about a center of rotation 24.

Rotation of the gantry 12 and the operation of the x-ray source 14 are governed by a control mechanism 26 of the CT imaging system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38. The reconstructed image may be stored as a data array.

One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a display 42.

Computer 36 also receives commands and scanning parameters from an operator via console 40 that has input devices such as a keyboard, mouse, touchscreen, microphone for voice commands, and the like. An associated display 42 allows the operator to observe the reconstructed image and other data from computer 36. Commands and parameters supplied by the operator and/or stored in mass storage 38 are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48. Other configurations of CT systems may be used, such as a C-arm, a manually operated table, and a mobile unit. Alternatively, the computer 36 may be a stand-alone configuration, typically used for processing, displaying and reviewing image data stored in a storage device, such as mass storage 38, or an optical or compact disc, for example.

The image enhancement discussed herein is suitable to enhancing images of IAC structures, but may also be used to enhance images of other structures. It should be understood that the image enhancement algorithm may be implemented in computer 36 and would process, for example, image data stored in mass storage 38. Alternatively, the image enhancement algorithm could be implemented in image reconstructor 34 and supply image enhanced data to computer 36. Other alternative implementations are possible.

Figure 3:
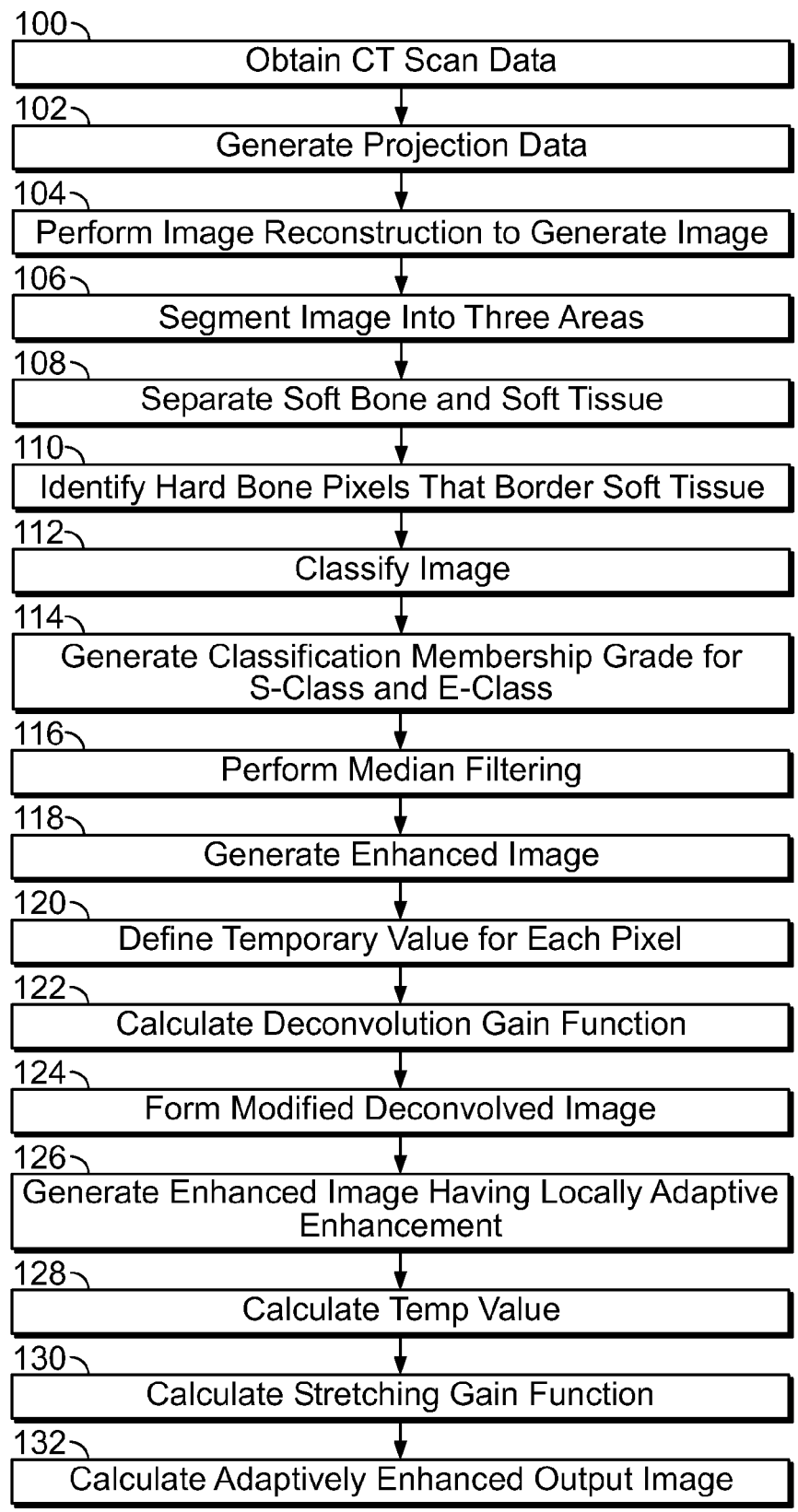
FIG. 3 illustrates a post-processing method to adaptively enhance CT images in accordance with an embodiment of the present invention.

FIG. 3 illustrates a post-processing method to adaptively enhance CT images in accordance with an embodiment of the present invention. The post-processing method increases the resolution and display intensities of the bony structures and enhances the contrast of these structures by reducing noise in the surrounding soft tissues. Non-linear bone gray scale stretching may be combined with non-linear deconvolution to enhance the bony structures, especially the lower density bones and other structures with similar densities. Also, although the method utilizes CT numbers, it should be understood that the steps used to create an adaptively enhanced CT image may be applied to numbers representing intensity values and other numbering and classification systems used in image processing.

In step 100, the CT imaging system 10 performs a CT scan, obtaining data from the detector elements 20 as previously discussed. In step 102, the image reconstructor 34 generates projection data and in step 104, the image reconstructor 34 performs high speed image reconstruction to generate an image or image data. For example, when creating the image, the image reconstructor 34 or the computer 36 assigns each pixel a CT number which may range, for example, between negative 1000 and positive 3000. Larger CT numbers are assigned to structure which creates greater attenuation. For example, a pixel representing air is assigned a CT number of negative 1000 while a pixel representing water is assigned a CT number of zero. Pixels representing bones with higher densities are assigned a higher positive CT number than pixels representing soft tissue or bones with lower densities, comparatively.

Many image reconstruction algorithms currently are implemented in commercially available CT systems and the present image enhancement algorithm could be implemented in connection with one or more such reconstruction algorithms. For example, the projection data may be pre-processed, filtered and then backprojected to create the image. Alternatively, steps 100, 102 and/or 104 may have been previously accomplished, and the raw, semi-processed, or processed data stored in mass storage 38 for further image processing at a later time.

In step 106, the computer 36 segments the image into three areas or regions based on each pixel's CT number. In other words, each pixel in the original image data is assigned to a certain region based on its intensity. First and second thresholds are defined based on known values and ranges of CT numbers representative of bone, soft tissue and air. Pixels with CT numbers less than the first threshold are segmented into an area 1 (A1), pixels with CT numbers between the first and second thresholds are segmented into an area 2 (A2), and pixels with CT numbers greater than the second threshold are segmented into an area 3 (A3). More thresholds may be used to further segment the image into additional areas. Areas A1 and A3 represent air and hard bone or higher density bone, respectively, and Area A2 represents a combination of soft tissues and lower density bone. Lower density bone may also be referred to as soft bone and may include other structures having a lower density than the relatively higher density bone. Due to the structure of the soft bones and the finite detection system resolution, the CT numbers of the soft bone overlap with the CT number of the soft tissues.

In step 108, the computer 36 segments the Area A2 to isolate a subset of pixels representative of the soft bones from the soft tissue. This segmentation may be accomplished by known methods, such as separating the soft tissues and the isolated soft bones based on a minimum value $\xi_{x,y}$ of the standard deviations formed in several directions from each identified pixel. By automatically segmenting the bony structures from the soft tissues, the fine structures of the bones may be enhanced while aliasing artifacts and noise are suppressed in the images.

In step 110, the computer 36 identifies pixels within the Area A3 (hard bone) that border with soft tissue to reduce or avoid the potential undershoot between the soft tissue and hard bones which may occur related to the deconvolution process. For each pixel in Area A3, the computer 36 calculates the CT number differences between the pixel and its neighboring pixels. For example, eight neighboring pixels may be used. The maximum difference is compared to a predefined threshold. By way of example only, the predefined threshold may be a CT number of 300 and may be based on known CT values of soft tissue and hard bone. For pixels having a maximum difference greater than the predefined threshold, the pixels are identified as border pixels located between soft tissue and hard bone. Optionally, the computer 36 may calculate the differences for a subset of pixels within Area A3, such as within a border range surrounding each Area A3 or every other pixel.

In step 112, the image is further classified into three classes. A first class comprises air (Area A1 of step 106) and hard bones bordering with soft tissue (pixels identified in step 110). No operation will be performed on the pixels within the first class. A second class (S-class) comprises soft tissues (Area A2 minus the isolated soft bones of step 108). A third class (E-class) comprises hard bones (Area A3 of step 106 minus pixels identified in step 110) and isolated soft bones (pixels identified in step 108). The E-class may also be referred to as a bone group.

In step 114, the computer 36 generates a classification membership grade $\eta_{x,y}$ for the E-class and S-class, based on the texture signatures $\xi_{x,y}$, which represents the pixel value of the reconstructed image, using Equation 1:

$$\eta_{x,y} = \begin{cases} 0 & \text{if } (\xi_{x,y} - \lambda)/\lambda \leq 0 \\ (\xi_{x,y} - \lambda)/\lambda & \text{if } 0 < (\xi_{x,y} - \lambda)/\lambda \leq 1 \\ 1 & \text{if } (\xi_{x,y} - \lambda)/\lambda > 1 \end{cases} \quad [1]$$

wherein λ is a predefined constant, such as a CT number of 100. Therefore, the pixels or CT numbers may be classified using fuzzy logic. If a pixel's classification membership grade is less than or equal to 0, the pixel represents soft tissue. If a pixel's classification membership grade is between 0 and 1, the pixel represents tissue somewhere between soft tissue and bone, such as relatively lower density bone, and if a pixel's classification membership grade is greater than 1, the pixel represents relatively higher density bone.

Figure 4:
FIG. 4 illustrates an example of the classification $\eta_{x,y}$ in accordance with an embodiment of the present invention.

In step 116, Median filtering may be performed on $\eta_{x,y}$ to further guard against sharp discontinuities between pixels within the E-class and S-class. FIG. 4 illustrates an example of the classification $\eta_{x,y}$ in accordance with an embodiment of the present invention. Areas of the image 150 shown in black represent soft tissue or air, while areas of the image 150 shown in white represent bone.

Optionally, the original image data may be smoothed prior to classification (step 112) to reduce the impact of noise on the pixel classification. For example, the original image data may be low-pass filtered to reduce the influence of statistical noise on the image classification.

In step 118, an enhanced dataset or an enhanced image may be generated using Equation 2:

$$P_E(x,y) = (1-\eta_{x,y}) * P_S(x,y) + \eta_{x,y} * P_D(x,y) \quad [2]$$

where $P_E$, $P_S$ and $P_D$ are enhanced, smoothed and deconvolved images, respectively. The smoothed and deconvolved images may be created during the reconstruction process (step 104) or after the reconstruction process, such as by using image space enhancement. With Equation 2, for the S-class pixels where $\eta_{x,y}$ is 0, the enhanced image will be smoothed, and for the E-class pixels, where $\eta_{x,y}$ is 1, the enhanced image will be sharpened. In other words, in regions of the image having substantially soft tissue, using the soft tissue image is desirable as it is smoother and has less noise. In regions of the image having substantially bone, a deconvolved or high-pass filtered image is desirable to emphasize the bony structure. The two images are merged together in Equation 2 to achieve the enhanced image $P_E$.

To further increase the deconvolution effects for lower density bones (soft bones), non-linear boosting is applied to the lower and higher density bones (E-class), identified previously in step 112. In other words, the deconvolution is modulated based on the CT numbers of the bones, and thus the image enhancement is object dependent. In step 120, the computer 36 defines a first temporary value tval for each pixel within the E-class using Equation 3:

$$tval = (im + abs(cth1))/bthd \quad [3]$$

wherein im is the image pixel value, cth1 is a predefined threshold which separates air from the other structures in the image (i.e. the soft tissue and soft and hard bones), and bthd is an upper threshold for bones. The upper threshold bthd may be a CT number of 2500, for example.

In step 122, the computer 36 calculates a deconvolution gain function using the temporary pixel values calculated with Equation 3. Relatively higher weights are given for pixels with relatively lower CT numbers. The deconvolution gain function may be expressed using polynomial equations such as in Equation 4:

$$dec\_gain = 2.5 - 0.52 * tval + 6.73 * tval^2 - 31.51 * tval^3 + 35.3 * tval^4 - 12.0 * tval^5 \quad [4]$$

In step 124, the computer 36 forms a modified deconvolved image $P_{MD}$ having locally adapted enhancement by using the deconvolution gain function calculated in Equation 4 in Equation 5:

$$P_{MD}(x,y) = im(x,y) - dec\_gain * (im(x,y) - P_D(x,y)) \quad [5]$$

Equation 5 may also be referred to as unsharp masking. The enhanced image is subtracted from the original image. The difference between the original image and the enhanced image represents the edge of the image. The edge is put back into the image to produce different amounts of enhancement wherein the amount of enhancement is dependent upon the deconvolution gain function. Therefore, it should be noted that the enhancement is not uniform across the image.

In step 126, the computer 36 may generate a second enhanced image having locally adaptive enhancement. Equation 6 substitutes the modified deconvolved image $P_{MD}$ of Equation 5 into Equation 2:

$$P_E(x,y) = (1-\eta_{x,y}) * P_S(x,y) + \eta_{x,y} * P_{MD}(x,y) \quad [6]$$

Therefore, smoothing is performed on soft tissues and deconvolution is performed on bony structures in the second enhanced image.

It is also desirable to enhance the visualization of the bony structures within the image on the display 42. Thus, to make the hard bones appear even sharper and brighter without saturating the display 42, a non-linear stretching gain is generated based on the CT numbers for the bony structures. This avoids potential over-brightening of dense bones. In step 128, the computer 36 calculates a second temporary value tval by dividing the bony pixels (E-class) of the modified deconvolved image (Equation 6) by a stretching threshold bths in Equation 7:

$$tval = P_E(x,y)/bths \quad [7]$$

By way of example only, a value of 2000 may be used for bths.

In step 130, the computer 36 calculates a stretching gain function sth_gain that applies relatively lower weights for pixels with relatively higher CT numbers and relatively higher weights for pixels with relatively lower CT numbers. In other words, the pixels with relatively higher CT numbers are changed or stretched less than the pixels with relatively lower CT numbers. The stretching gain function can generally be expressed using polynomial equations, an example of which is Equation 8:

$$sth\_gain = 1.0 + 0.19 * tval - 2.2 * tval^2 + 2.66 * tval^3 - 3.09 * tval^4 + 1.44 * tval^5 \quad [8]$$

In step 132, the computer 36 calculates an adaptively enhanced output image using Equation 9:

$$Out(x,y) = (P_E(x,y) - bth) * scale * sth\_gain + P_E(x,y) \quad [9]$$

where bth is a threshold for bone and scale is a constant typically between 0 and 1.

Figure 5:
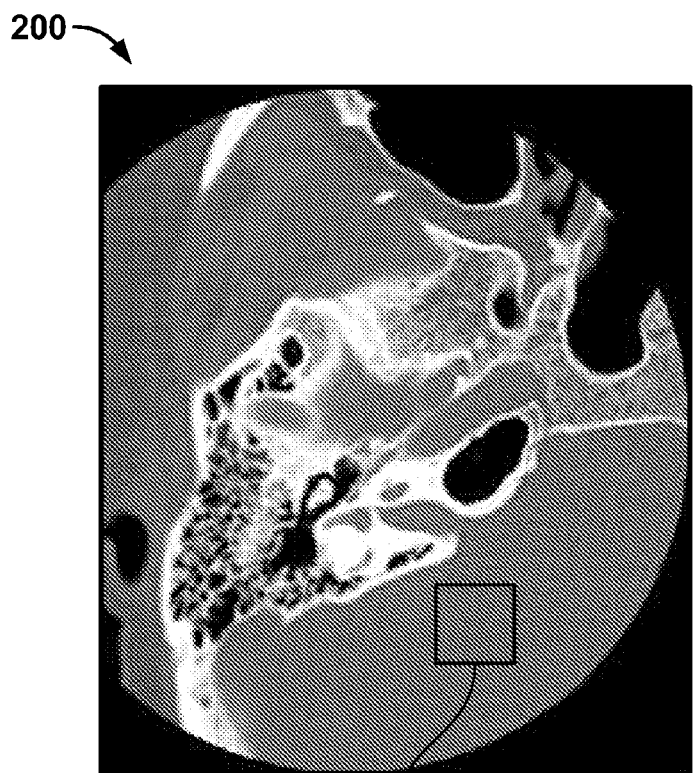
FIG. 5 illustrates an enhanced IAC image generated without adaptive enhancement and displayed on the display (FIG. 2).
Figure 6:
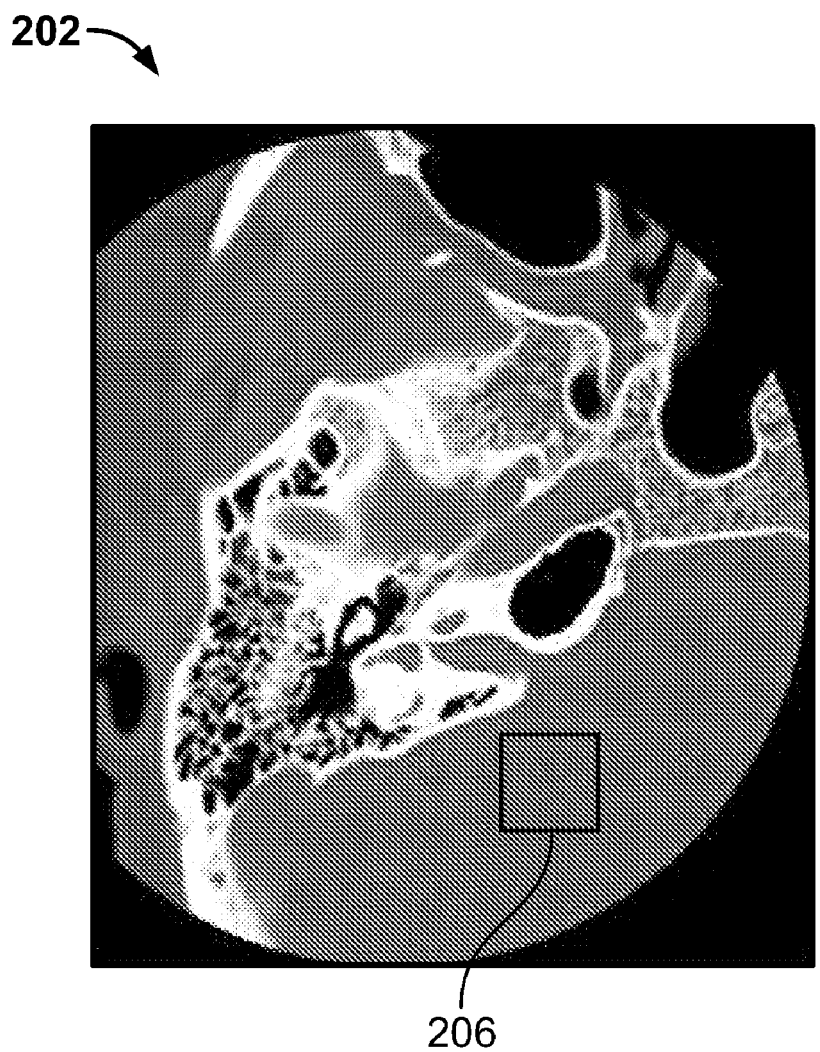
FIG. 6 illustrates an adaptively enhanced IAC image generated based on the method of FIG. 3 and displayed on the display (FIG. 2) in accordance with an embodiment of the present invention.

FIG. 5 illustrates an enhanced IAC image 200 generated without adaptive enhancement and displayed on the display 42 (FIG. 2). FIG. 6 illustrates an adaptively enhanced IAC image 202 generated based on the method of FIG. 3 and displayed on the display 42 (FIG. 2) in accordance with an embodiment of the present invention. The images 200 and 202 in FIGS. 5 and 6 are generated based on the same image data set. Structures shown in gray represent soft tissue, structures shown in white represent bone, and structures shown in black represent air.

A standard deviation of 41.3 is calculated within box 204 of image 200, while a standard deviation of 30.5 is calculated within box 206 of image 202. Therefore, the soft tissue portion of the adaptively enhanced IAC image 202 is smoother. Bony structures (white areas) are brighter in the image 202, but do not saturate the display 42. Also, the bony structures in image 202 are more defined and sharp when compared to the neighboring soft tissue than in image 200. Therefore, the non-linear deconvolution targeted the lower density bones to boost the values of the lower density bones, resulting in a more even boosting within the adaptively enhanced IAC image 202 overall. The non-linear stretching of the bone CT numbers avoids over-stretching the higher density bones, and thus avoids saturating the display 42. In addition, by identifying boundaries between higher density bone and soft tissue, undershooting artifacts may be reduced or avoided. It should be understood that not all of the image enhancements discussed above in FIG. 3 and displayed in the image 202 of FIG. 6 need to be accomplished when processing an IAC image or other images having similar structures. Rather, an operator may choose to apply a portion or subset of the steps to accomplish a desired level of image enhancement.

A technical effect of the adaptively enhanced post-processing image algorithm is the enhancement of bony structures, including soft bones and structures with densities lower than hard bones and higher than soft tissue. The adaptively enhanced algorithm enhances the bony structures by identifying the bony structures, and applying non-linear gray scale stretching and/or non-linear deconvolution. The contrast of the bony structures may be further enhanced by reducing noise of the surrounding soft tissues. The undershooting artifacts between the soft tissue and higher density bones typically associated with the deconvolution process are avoided or reduced.

While the invention has been described in terms of various specific embodiments, those skilled in the art will recognize that the invention can be practiced with modification within the spirit and scope of the claims.

What is claimed is:

1. A method for locally enhancing image data represented as pixels having CT numbers, the image data including bony structures, comprising:
   segmenting pixels within the image data into areas based on the pixel's CT number using a computer, a first area representing a combination of soft tissue and bones having a first density and a second area representing bones having a second density that is greater than the first density;
   identifying a subset of pixels based on their locations within the second area representative of the bones;
   applying an enhancement to the subset of pixels within the second area to create an enhanced dataset; and
   generating a locally enhanced image based on the image data and the enhanced dataset using the computer.

2. The method of claim 1, the enhancement further comprising a non-linear deconvolution gain function for applying a first weight to the pixels having CT numbers that are less than a predefined threshold and a second weight that is less than the first weight, to the pixels having CT numbers greater than the predefined threshold.

3. The method of claim 1, further comprising:
   calculating CT number differences between a first pixel within the second area and multiple pixels neighboring the first pixel; and
   identifying a maximum CT number difference based on the calculating step, applying the enhancement to the first pixel within the second area when the maximum CT number difference of the first pixel is less than a predefined threshold.

4. The method of claim 1, further comprising:
   for at least two pixels within the second area, calculating CT number differences between the at least two pixels and multiple neighboring pixels; and
   identifying a set of pixels within the second area having a maximum CT number difference less than a predefined threshold, applying the enhancement to the set of identified pixels within the second area, the predefined threshold being based on CT numbers representative of at least one of hard bone and soft tissue.

5. The method of claim 1, further comprising;
   segmenting the first area based on texture signatures; and
   performing median filtering on the texture signatures to reduce discontinuities between the soft tissue and the bones having the first density.

6. The method of claim 1, further comprising:
   forming a bone group comprising the second area and the subset of pixels representative of the bones having the first density; and
   calculating a non-linear stretching gain for each pixel within the bone group, the stretching gain applying a second set of weights to the pixels having CT numbers greater than a predefined threshold and a first weights to the pixels having CT numbers less than the predefined threshold.

7. The method of claim 1, further comprising stretching the CT numbers of the subset of pixel and the second area, the stretching being applied non-linearly wherein the pixels having CT number greater than a predefined threshold are stretched less than the pixels having a second CT number that is less than the predefined threshold.

8. The method of claim 1, the applying step further comprising:
   calculating a non-linear deconvolution gain function for the subset of pixels and the second area based on the temporary value and a polynomial equation; and
   forming a modified deconvolved image based on the image data and the non-linear deconvolved gain function, the locally enhanced image being further based on the modified deconvolved image.

9. A system for locally enhancing image data represented as pixels having CT numbers, the image data including bony structures, the system comprising:
   a computer for receiving original image data comprising pixels having associated CT numbers, the computer configured to:
   segment pixels within the image data into areas based on the pixel's CT number, a first area representing a combination of soft tissue and bones having a first density and a second area representing bones having a second density that is greater than the first density;
   identify a subset of pixels based on their locations within the second area representative of the bones;
   apply an enhancement to the subset of pixels within the second area to create an enhanced dataset; and generate a locally enhanced image based on the image data and the enhanced dataset.

10. The system of claim 9, the computer further configured to apply the enhancement comprising a non-linear deconvolution gain function, the non-linear deconvolution gain function applying a first weight to the pixels having CT numbers that are less than a predefined threshold and a second weight, that is less than the first weight, to the pixels having CT numbers that are greater than the predefined threshold.

11. The system of claim 9, the computer further configured to:
   for at least two pixels within the second area, calculate CT number differences between the at least two pixels and multiple neighboring pixels; and
   identify a set of pixels within the second area having a maximum CT number difference less than a predefined threshold, applying the enhancement to the set of pixels within the second area the predefined threshold based on CT numbers representative of at least one of hard bone and soft tissue.

12. The system of claim 9, wherein the computer being one of connected to a CT imaging system and a stand-along processing station.

13. The system of claim 9, the computer further configured to stretch the CT numbers of the subset of pixels and the second area, the stretching being applied non-linearly wherein the pixels having a CT number greater than a predefined threshold are stretched less than the pixels having a CT number that is less than the predefined threshold.

14. The method of claim 1 further comprising applying a non-linear stretching gain function to the second area representing the bones having the second density to increase the sharpness and the brightness to the second area.

15. The method of claim 1 further comprising smoothing the image data prior to segmenting the pixels to reduce statistical noise in the image data.

16. The method of claim 1 further comprising low-pass filtering the image data prior to segmenting the pixels to reduce statistical noise in the image data.

17. The method of claim 1 wherein segmenting further comprises identifying a bony region and a soft-tissue region in the first area to reduce overshoot and undershoot.

* * * * *